United States Patent [19]

Tanaka et al.

[11] Patent Number: 4,562,714
[45] Date of Patent: Jan. 7, 1986

[54] PRECOAT METAL AND ITS PRODUCTION

[75] Inventors: Michio Tanaka, Takatsuki; Kohji Nasu, Nishinomiya; Masanori Okamura, Amagasaki, all of Japan

[73] Assignee: Takeda Chemical Industries, Ltd., Osaka, Japan

[21] Appl. No.: 550,991

[22] Filed: Nov. 14, 1983

Related U.S. Application Data

[62] Division of Ser. No. 212,684, Dec. 3, 1980, abandoned.

[30] Foreign Application Priority Data

Dec. 21, 1979 [JP] Japan ................... 54-167037
Jun. 19, 1980 [JP] Japan ................... 55-83689

[51] Int. Cl.$^4$ .................... B21B 45/00; B32B 27/40
[52] U.S. Cl. .......................... 72/46; 427/358; 427/386; 427/388.2; 428/425.8; 428/418; 428/458; 428/463; 528/45
[58] Field of Search .......... 428/425.8, 418, 458, 428/463; 528/45; 72/46; 427/358, 386, 388.2

[56] References Cited

U.S. PATENT DOCUMENTS

| | | | |
|---|---|---|---|
| 3,350,362 | 10/1967 | Potts | 525/123 |
| 3,676,402 | 7/1972 | Matsui | 528/45 |
| 3,694,389 | 9/1972 | Levy | 528/45 |
| 3,830,785 | 8/1974 | Matsui | 528/45 |
| 4,046,744 | 9/1977 | Jenkins | 428/425.8 |
| 4,082,634 | 4/1978 | Chang | 428/425.8 |
| 4,089,844 | 5/1978 | Tsou | 528/45 |
| 4,163,094 | 7/1979 | Turpin | 528/45 |
| 4,238,592 | 12/1980 | Schmitt | 528/45 |
| 4,284,572 | 8/1981 | Stanley | 528/45 |
| 4,301,053 | 11/1981 | Wolfrey | 428/425.8 |

Primary Examiner—Ellis P. Robinson
Attorney, Agent, or Firm—Wenderoth, Lind & Ponack

[57] ABSTRACT

A precoat metal, which has been prepared by coating a metal plate with a composition comprising (i) at least one member selected from the group consisting of (a) bis(isocyanatomethyl)cyclohexane and/or its adduct blocked with a blocking agent and (b) an isocyanate blocked with ethyleneimine and (ii) a polyol resin, and heating the thus coated metal plate to cure the coating material.

Such film, when applied as a coating to a metal plate is completely free from yellowing and thermal degradation, and also exhibits increased hardness as well as a high flexural strength, staining resistance and chemical resistance.

The precoat metal is advantageously utilized in construction materials, for example, roof decking and wall panels; and materials for light electrical appliances such as refrigerators and radios and TV, vending machine cabinets etc.

1 Claim, No Drawings

PRECOAT METAL AND ITS PRODUCTION

This application is a division of now abandoned application Ser. No. 212,684, filed Dec. 3, 1980.

This invention relates to a precoat metal and its production.

Heretofore, a precoat metal, for example, precoat metal plates have been produced by applying a coating on a metal plate and heating the thus coated metal plate cure the coated material. Conventionally used as the coating for precoating are aminoalkyd resins, melamine-curing acrylic polyols or epoxy resins. The precoat metal coated with these resins are, however, of unsuitable properties for satisfactory subsequent fabrication (poor flexural strength) and, it has been found out that bending at an angle of 90 degrees or more gives rise to cracking on the coating films.

The present inventors, in attempting to overcome this drawback, carried out extensive research work and, as a result, found that the composition particularly based on bis(isocyanatomethyl)cyclohexane, among known organic polyisocyanates, yields a precoat metal having suitable properties for satisfactory subsequent fabrication (high flexural strength) as well as superior hardness, staining resistance and chemical resistance.

It was also found by the inventors that the polyurethane coating by the use of the isocyanate blocked with ethyleneimine, among known blocking agents, yields the precoat metal having excellent properties, such as curability and high flexural strength as well as superior hardness, staining resistance and chemical resistance.

The above findings were followed by further research which has resulted in this invention.

According to one aspect of this invention there is provided a precoat metal, which has been prepared by coating a metal plate with a composition comprising (i) at least one member selected from the group consisting of (a) bis(isocyanatomethyl)cyclohexane and/or its adduct wherein one or more of the isocyanate groups therein is blocked with a blocking agent and (b) an isocyanate blocked with ethyleneimine and (ii) a polyol resin, and heating thus coated metal plate for curing.

Bis(isocyanatomethyl)cyclohexane and/or its adduct wherein one or more of the isocyanate groups therein is blocked with a blocking agent (a) is prepared by the reaction of bis(isocyanatomethyl)cyclohexane and/or its adduct with a blocking agent.

As examples of the bis(isocyanatomethyl)cyclohexane, there may be mentioned 1,2-bis(isocyanatomethyl)cyclohexane, 1,3-bis(isocyanatomethyl)cyclohexane, 1,4-bis(isocyanatomethyl)cyclohexane and their mixture.

Examples of the adduct of bis(isocyanatomethyl)cyclohexane include urethanes obtained by reacting an excess of either of the above-mentioned isocyanates with a low-molecular-weight polyol such as ethylene glycol, propylene glycol, 1,3-butylene glycol, 1,4-butylene glycol, neopentyl glycol, 2,2,4-trimethyl-1,3-pentanediol, triethylene glycol, hexamethylene glycol, cyclohexanedimethanol, cyclohexanediol, trimethylolethane, trimethylolpropane, glycerol, hexanetriol, hydrogenated bisphenol A, sorbitol, sorbit, sucrose, pentaerythritol and quadrol, or a high-molecular-weight polyol having a molecular weight of 500 to 3,000 such as polyester polyol, polyether polyol and epoxy polyol resin, biurets obtained by reacting water, a lower amine such as ethylene diamine, etc. with an excess of bis(isocyanatomethyl)cyclohexane, allophanates obtained by reacting the above-mentioned low-molecular-weight polyol or high-molecular-weight polyol with an excess of bis(isocyanatomethyl)cyclohexane, and so on.

Even a large amount of a bis(isocyanatomethyl)cyclohexane monomer contained in the above-mentioned urethanes, biurets or allophanates can be employed in this invention.

As the blocking agent, use may be made of any of blocking agents known to be employable for the blocking of isocyanates such as those based on phenol, lactam, active methylene, alcohol, mercaptan, acid amide, imide, amine, imidazole, urea, carbamic acid salt, imine, oxime and sulfite. Among them, the blocking agents based on phenol, oxime, lactam and imine are advantageously employed. As specific examples of the blocking agent, there may be mentioned the following:

Blocking agents based on phenol:
Phenol, cresol, xylenol, nitrophenol, chlorophenol, ethylphenol, p-hydroxydiphenyl, t-butylphenol, o-isopropylphenol, o-sec-butylphenol, p-nonylphenol, p-t-octylphenol, hydroxybenzoic acid, hydroxybenzoic acid ester, etc.

Blocking agents based on lactam:
$\epsilon$-Caprolactam, $\delta$-valerolactam, $\gamma$-butyrolactam, $\beta$-propiolactam, etc.

Blocking agents based on active methylene:
Diethyl malonate, dimethyl malonate, ethyl acetoacetate, methyl acetoacetate, acetylacetone, etc.

Blocking agents based on alcohol:
Methanol, ethanol, n-propyl alcohol, isopropyl alcohol, n-butyl alcohol, isobutyl alcohol, t-butyl alcohol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, benzyl alcohol, methoxymethanol, glycolic acid, glycolates such as methyl glycolate, ethyl glycolate and butyl glycolate, lactic acid, lactic acid esters such as methyl lactate, ethyl lactate and butyl lactate, methylolurea methylolmelamine, diacetone alcohol, ethylene chlorohydrin, ethylene bromohydrin, 1,3-dichloro-2-propanol, $\omega$-hydroperfluoroalcohol, acetone cyanhydrin, etc.

Blocking agents based on mercaptan:
Butylmercaptan, hexylmercaptan, t-butylmercaptan, t-dodecylmercaptan, 2-mercaptobenzothiazole, thiophenol, methylthiophenol, ethylthiophenol, etc.

Blocking agents based on acid amide:
Acetanilide, acetaniside, acetotoluide, acrylamide, methacrylamide, acetamide, stearic acid amide, benzamide, etc.

Blocking agents based on imide:
Succinimide, phthalimide, maleimide, etc.

Blocking agents based on amine:
Diphenylamine, phenylnaphthylamine, xylidine, N-phenylxylidine, carbazole, aniline, naphthylamine, butylamine, dibutylamine, butylphenylamine, etc.

Blocking agents based on imidazole:
Imidazole, 2-ethylimidazole, etc.

Blocking agents based on urea:
Urea, thiourea, ethylene urea, ethylene thiourea, 1,3-diphenyl urea, etc.

Blocking agents based on carbamic acid:
Phenyl N-phenylcarbamate, 2-oxazolidone, etc.

Blocking agents based on imine:
ethyleneimine, propyleneimine, etc.

Blocking agents based on oxime:

Formamidoxime, acetaldoxime, acetoxime, methyl ethyl ketoxime, diacetylmonoxime, benzophenoneoxime, cyclohexanoneoxime, etc.

Blocking agents based on sulfite:

Sodium bisulfite, potassium bisulfite, etc.

Bis(isocyanatomethyl)cyclohexane and/or its adduct blocked with a blocking agent (a) is obtained by, for example, a procedure of reacting bis(isocyanatomethyl)cyclohexane and/or its adduct with the above-mentioned blocking agent at an NCO/blocking agent equivalent ratio of about 0.9 to 1.0, preferably about 0.95 to 1.0, a procedure which comprises reacting bis(isocyanatomethyl)cyclohexane with a blocking agent at an NCO/blocking agent equivalent ratio of about 1.1 to 3.0, preferably about 1.2 to 2.0, followed by reacting further with the above-mentioned low-molecular-weight polyol, high-molecular-weight polyol, water or lower amine, or a procedure which consists of reacting bis(isocyanatomethyl)cyclohexane with a low-molecular-weight polyol, high-molecular-weight polyol, water or lower amine at an NCO/active hydrogen equivalent ratio of about 1.5 to 10.0, preferably about 2.0 to 7.0, followed by reacting further with a blocking agent.

Each of the above-mentioned reactions is carried out by a conventional procedure in the presence or absence of a solvent not having active hydrogen (e.g. esters such as ethyl acetate and butyl acetate, ketones such as acetone, methyl ethyl ketone and methyl isobutyl ketone, ethers such as tetrahydrofuran, and the like). In conducting the reaction, a known catalyst such as tertiary amine and organometallic compound may be used.

An isocyanate blocked with ethyleneimine (b) is prepared by the reaction of an isocyanate with ethyleneimine.

As examples of the isocyanate, there may be mentioned aliphatic diisocyanates such as trimethylenediisocyanate, tetramethylenediisocyanate, hexamethylenediisocyanate, pentamethylenediisocyanate, 1,2-propylenediisocyanate, 2,3-butylenediisocyanate, 1,3-butylenediisocyanate, 2,4,4- or 2,2,4-tirmethylhexamethylenediisocyanate, dodecamethylenediisocyanate and 2,6-diisocyanatomethylcaproate; cycloalkylenediisocyanates such as 1,3-cyclopentanediisocyanate, 1,4-cyclohexanediisocyanate, 1,3-cyclohexanediisocyanate, 3-isocyanatomethyl-3,5,5-trimethylcyclohexylisocyanate, 4,4'-methylenebis(cyclohexylisocyanate), methyl-2,4-cyclohexanediisocyanate, methyl-2,6-cyclohexanediisocyanate, 1,4-bis(isocyanatomethyl)cyclohexane and 1,3-bis(isocyanatomethyl)cyclohexane; aromatic diisocyanates such as m-phenylenediisocyanate, p-phenylenediisocyanate, 4,4'-diphenyldiisocyanate, 1,5-naphthalenediisocyanate, 4,4'-diphenylmethanediisocyanate, 2,4- or 2,6-tolylenediisocyanate, 4,4'-toluidinediisocyanate, dianisidinediisocyanate and 4,4'-diphenyl ether diisocyanate, aromaticaliphatic diisocyanates such as ω,ω'-diisocyanate-1,3-dimethylbenzene, ω,ω'-diisocyanate-1,4-dimethylbenzene and ω,ω'-diisocyanate-1,4-diethylbenzene, etc.; triisocyanates such as triphenylmethane-4,4',4''-triisocyanate, 1,3,5-triisocyanatebenzene, 2,4,6-triisocyanatetoluene and ω-isocyanateethyl-2,6-diisocyanato caproate; tetraisocyanates such as 4,4'-diphenyldimethylmethane-2,2'-5,5'-tetraisocyanate; polymerized polyisocyanates such as tolylenediisocyanate dimer and trimer; and polymethylene-polyphenyl polyisocyanate or polyisocyanates obtained by reacting an excess of the above-mentioned isocyanate compound with a low-molecular-weight active hydrogen containing compound such as ethylene glycol, propylene glycol, dipropylene glycol, diethylene glycol, triethylene glycol, butylene glycol, 2,2,4-trimethyl-1,3-pentanediol, neopentyl glycol, hexanediol, cyclohexanedimethanol, cyclohexanediol, hydrogenated bisphenol A, xylylene glycol, glycerol, trimethylolethane, trimethylolpropane, hexanetriol, pentaerythritol, sorbitol, sorbit, sucrose, castor oil, ethylene diamine, hexamethylene diamine, ethanolamine, diethanolamine, triethanolamine, water, ammonia, and urea etc. or a high-molecular-weight active hydrogen containing compound such as various kinds of polyether polyol, polyester polyol and acrylic polyol; or allophanates or biurets etc. obtained by the reaction of the above polyisocyanates.

These may be used alone or as a mixture of two or more of them.

From the standpoint of the physical properties to be realized, preferred are hexamethylene diisocyanate, 3-isocyanatomethyl-3,5,5-trimethylcyclohexylisocyanate, 4,4'-methylene-bis-(cyclohexylisocyanate), bis(isocyanatomethyl)cyclohexane, tolylenediisocyanate, ω,ω'-diisocyanate-dimethylbenzene and diphenylmethanediisocyanate.

The reaction of the above-mentioned isocyanate compound with ethyleneimine is carried out by a conventional procedure in the presence of a solvent not having active hydrogen.

The ratio of the isocyanate compound relative to ethyleneimine is normally within the range of NCO/NH=about 1.00 to 1.05.

In conducting the reaction, a known catalyst such as tertiary amine and organic metal may be used.

As examples of the polyol resin (ii) which is used in this invention, there may be mentioned polyester polyol resins, acrylic polyol resins, epoxy polyol resins or their mixtures.

Such polyester polyol resins are obtained by subjecting a polybasic acid such as phthalic acid, isophthalic acid, terephthalic acid, maleic acid, fumaric acid, succinic acid, adipic acid, sebacic acid, azelaic acid and trimellitic acid to a conventional condensation with a polyol such as ethylene glycol, diethylene glycol, propylene glycol, dipropylene glycol, 1,3-butanediol, 1,4-butanediol, 1,5-pentanediol, neopentyl glycol, 1,6-hexamethylene glycol, decamethylene glycol, hydroquinonebis(hydroxyethyl ether), 2,2,4-trimethyl-1,3-pentanediol, hydrogenated bisphenol A, trimethylolethane, trimethylolpropane, hexanetriol, glycerol, pentaerythritol, tris(hydroxyethyl)isocyanurate, cyclohexanediol, cyclohexanedimethanol, xylylene glycol and quadrol under the conditions of excess hydroxyl groups. In such cases, acids or polyols may be used in combination with two or more kinds thereof, respectively. In addition, castor oil, higher fatty acids, etc. may be used in conjunction with the above to derive the so-called oil-modified polyester polyols.

Out of the polyester polyol resins obtained by the combination of the above-mentioned raw materials, preferably used are those having molecular weight of about 500 to 50,000, preferably about 2,000 to 10,000, hydroxyl value of about 10 to 300, preferably about 20 to 200, and acid value of about 1 to 100, preferably about 2 to 50.

The acrylic polyol resin include, for example, those obtained by copolymerizing (1) 2-hydroxyethyl acrylate, 2-hydroxypropyl acrylate, 2-hydroxyethyl methacrylate, 2-hydroxypropyl methacrylate, allyl alcohol, cinnamic alcohol, crotonyl alcohol, or hydroxyl-containing monomers or reaction products from unsaturated carboxylic acids such as acrylic acid, methacrylic acid, maleic acid, fumaric acid, crotonic acid and itaconic acid with ethylene glycol, ethylene oxide, propylene glycol, propylene oxide, butylene glycol, 1,4-cyclohexyldimethanol, phenyl glycidyl ether, glycidyl decanoate, etc., with (2) one or more than two kinds of copolymerizable, α,β-ethylenically unsaturated monomers such as acrylates, e.g. methyl acrylate, ethyl acrylate, n-propyl acrylate, isopropyl acrylate, n-butyl acrylate, tert-butyl acrylate and 2-ethylhexyl acrylate, methacryaltes, e.g. methyl methacrylate, ethyl methacrylate, n-propyl methacrylate, isopropyl methacrylate, n-butyl methacrylate, tert-butyl methacrylate and 2-ethylhexyl methacrylate, styrene based monomers, e.g. styrene, vinyl-toluene and α-methylstyrene, other acrylic acids and methacrylic acids, vinyl acetate, vinyl propionate, acrylonitrile, vinyl stearate, allyl acetate, diallyl adipate, dimethyl itaconate, diethyl maleate, vinyl chloride, vinylidene chloride, ethylene glycidyl methacrylate, N-methylolacrylamide, N-buthoxymethylacrylamide, acrylamide, diacetone acrylamide and the like.

Among the acrylic polyol resins obtained by the combination of the above-mentioned raw materials, preferably used are those having molecular weight of about 1,000 to 100,000, preferably about 5,000 to 50,000, and hydroxyl value of about 10 to 300, preferably about 20 to 200.

When the isocyanate blocked with ethyleneimine (b) is used as component (i), preferred are those having the number of carboxyl groups corresponding to acid value of 2 to 20 so as to lower the baking temperature of the coating.

The epoxy polyol resin include, for example, those having at least two hydroxyl groups in its molecule, which are obtained by condensing bisphenol A with epichlorhidrin.

The epoxy polyol resin is shown by the following chemical structure.

an isocyanate blocked with ethyleneimine and (ii) a polyol resin is, in the first place, applied on a metal plate. The formulating ratio of the polyol resin (ii) and the component (i) is adjusted in such a way that the equivalent ratio of the sum of the regenerated isocyanate group of (a) bis(isocyanatomethyl)cyclohexane and/or its adduct blocked with a blocking agent and the aziridine group of (b) the isocyanate blocked with ethyleneimine against the active hydrogen group of the polyol resin (ii) may be about 0.5 to 2.0, preferably about 0.5 to 1.5.

The composition, in addition to the components (i) and (ii), may contain organic solvents such as esters, e.g. ethyl acetate, butyl acetate, methyl acetoacetate, 2-ethoxyethyl acetate, etc., aromatic solvents, e.g. xylene, toluene, etc., ketones, e.g. methyl ethyl ketone, methyl isobutyl ketone and cyclohexanone, and ethers, e.g. diethylene glycol dimethyl ether, compounds having isocyanate groups at their terminals such as bis-(isocyanatomethyl)cyclohexane, and other additives such as pigments, levelling agents, antifoaming agents, dissociation catalysts and stabilizers. The quantity of the organic solvent is in the region of about 0 to 90 weight % against solid content of the components (i) and (ii).

The metal plate which is used in this invention, normally, may be any type of metal plates employed as metal for precoat metal, being exemplified by aluminum, cold-rolled steel, tin mill black-plate steel, electrolytic tin steel, electroglavanized steel, hot dip galvanized steel, aluminised steel, preplated steel, zinc-plated iron and iron, and those subjected to chemical surface treatment such as phosphate-pickling are preferred.

Shape and form of metal plates may be either flatplate shaped or cylindrical.

The application rate is preferably in the range of about 10 g/m² to 30 g/m² on a dry weight basis.

As examples of the means of application, there may be mentioned spray-gun, roll coater, flow coater, etc.

In the next place, in this invention, the metal plate applied with the composition comprising the components (i) and (ii) is heated for curing.

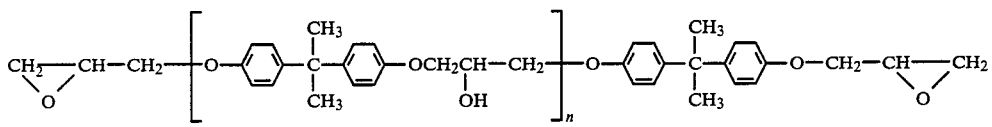

Among the epoxy polyol resins mentioned above, preferably used are those having n=about 2 to 1,000, preferably about 2 to 200, epoxy equivalent of 425 to 150,000, preferably about 425 to 60,000 and hydroxyl value of about 100 to 200.

In addition, an epoxy ester polyol resin or modified epoxy polyol resin obtained by the reaction of the abovementioned epoxy polyol resin with, for example, soybean oil fatty acid or alkanolamine, respectively, may be used in this invention.

Among others, polyurethane polyol, polylactone polyol and vinyl polymer containing hydroxyl groups(s) etc. may be used. When the isocyanate blocked with ethyleneimine (b) is used as component (i), polyester polyol resin or acrylic polyol resin containing carboxyl group(s) may be employed.

According to this invention, the composition comprising (i) at least one member selected from the group consisting of (a) bis(isocyanatomethyl)cyclohexane and/or its adduct blocked with a blocking agent and (b)

The heating temperature, is about 100° to 350° C., while the heating time is preferably in the range of about 20 to 120 seconds. Through such heating procedure, crosslinking takes place by the reaction of blocked isocyanates and/or aziridine groups in the component (i) with active hydrogen groups in the component (ii), yielding tough coating films. The resulting coating films are completely freed of yellowing and thermal degradation, and also exhibit increased hardness as well as a high flexural strength, staining resistance and chemical resistance. Consequently, the precoat metal as obtained according to this invention is advantageously utilized for building and construction materials such as roof decking, baseboard, exterior building panels, siding, wall panels and telephone booths, light electrical appliances such as heating covers, refrigerator, radio and TV cabinets, air conditioners and electric dryers, business machines and vending machines.

This invention is more specifically illustrated by the following examples. In the examples, parts or % means parts by weight or weight %, respectively.

EXAMPLE 1

A mixture of 581.5 parts of isophthalic acid, 707.9 parts of sebacic acid, 624.9 parts of neopentyl glycol and 124.1 parts of ethylene glycol was heated at 220° C., and allowed to undergo reaction, while blowing a nitrogen gas to distill off resulted water. By the above procedure there was obtained a polyester polyol resin with acid value of 2.4 and hydroxyl value of 55. The resin was dissolved in a 1:1 mixed solvent of xylene and cyclohexanone to a solution with a solid content of 40%. On the other hand, 582.6 parts of 1,3-bis(isocyanatomethyl)cyclohexane was mixed with 326 parts of ethyl acetate and 326 parts of ethoxyethyl acetate, followed by heating at 75° to 80° C. 134.1 parts of molten trimethylolpropane was added in the to maintain the temperature and was allowed to undergo reaction at 75° to 80° C. for 5 hours. Then, 261.3 parts of methyl ethyl ketoxime was added dropwise over a period of 1 hour, followed by heating further at 75° to 80° C. for 1 hour after the completion of the addition. In this manner, there was obtained a blocked polyisocyanate solution in which the content of regenerated isocyanate was 7.7% and the content of solid portion was 60%.

2550 parts of the above-mentioned polyester polyol resin and 898 parts of titanium oxide were kneaded, and further mixed with 2 parts of 1,1,3,3-tetra-n-butyl-1,3-diacetoxydistannoxane and 545 parts of the above-mentioned blocked polyisocyanate solution. The mixture was applied with roll coater on 0.3-mm thick, surface-treated galvanized sheet iron to a dried coating film thickness of 20μ, which was then baked in the atmosphere at 280° C. for 60 seconds, thereby yielding a glossy white coating film. The properties of the coating film are shown in Table 1.

REFERENCE EXAMPLE 1

In 300 parts of ethyl acetate and 300 parts of ethoxyethyl acetate was dissolved 504.6 parts of hexamethylene diisocyanate, and the solution was heated at 75° to 80° C. 134.1 parts of molten trimethylolpropane was added gradually to the solution to maintain such temperature, followed by heating further at 75° to 80° C. for 5 hours after the completion of the addition. Then, 261.3 parts of methyl ethyl ketoxime was added dropwise over a 1-hour period, followed by heating further at 75° to 80° C. for 1 hour after the completion of the addition. In this way, there was obtained a blocked isocyanate solution in which the content of regenerated isocyanate was 8.4% and the content of solid portion was 60%. 2550 parts of the polyester polyol resin (the same as prepared in Example 1) and 880 parts of titanium oxide were kneaded, and further mixed with 1.5 parts of 1,1,3,3-tetra-n-butyl-1,3-diacetoxydistannoxane and 500 parts of the above-mentioned blocked polyisocyanate solution. The mixture was painted with roll coater on 0.3-mm thick, surface-treated galvanized sheet iron to a dried coating film thickness of 20μ, which was then baked in the atmosphere at 280° C. for 60 seconds, thereby yielding a glossy white coating film. The properties of the coating film are shown in Table 1.

REFERENCE EXAMPLE 2

In 354.1 parts of ethyl acetate and 354.1 parts of ethoxyethyl acetate was dissolved 666.9 parts of 3-isocyanatomethyl-3,5,5-trimethycyclohexylisocyanate, and the solution was heated at 75° to 80° C. After the addition of 0.2 part of 1,1,3,3-tetra-n-butyl-1,3-diacetoxydistannoxane, 134.1 parts of molten trimethylolpropane was added dropwise over a 1-hour period, followed by heating at 75° to 80° C. for 5 hours after the completion of the addition. Then, 261.3 parts of methyl ethyl ketoxime was added dropwise over a 1-hour period, followed by heating further at 75° to 80° C. for 1 hour after the completion of the addition. In this manner, there was obtained a blocked polyisocyanate solution in which the content of regenerated isocyanate was 7.1% and the content of solid portion was 60%. 2550 parts of the polyester polyol resin (the same as prepared in Example 1) and 916 parts of titanium oxide were kneaded, and further mixed with 2 parts of 1,1,3,3-tetra-n-butyl-1,3-diacetoxydistannoxane and 590 parts of the above-mentioned blocked polyisocyanate solution. The mixture was painted with roll coater on 0.3-mm thick, surface-treated galvanized sheet iron to a dried coating film thickness of 20μ, which was then baked in the atmosphere at 280° C. for 60 seconds, thereby yielding a glossy white coating film. The properties of the coating film are shown in Table 1.

EXAMPLE 2

In 375 parts of ethoxyethyl acetate was dissolved 233 parts of 1,4-bis(isocyanatomethyl)cyclohexane, and 174.2 parts of methyl ethyl ketoxime was added dropwise to the solution, followed by heating at 75° to 80° C. for 1 hour after the completion of the addition. Then, 155.2 parts of polytetramethylene ether glycol with molecular weight of 620 and 0.7 part of dibutyltin dilaurate were added to undergo reaction at 75° to 80° C. for 5 hours. In this manner, there was obtained a blocked polyisocyanate solution in which the content of regenerated isocyanate was 8.5% and the content of solid portion was 60%. 2550 parts of the polyester polyol resin (the same as prepared in Example 1) and 878 parts of titanium oxide were kneaded and further mixed with 1.5 parts of 1,1,3,3-tetra-n-butyl-1,3-diacetoxydistannoxane and 494 parts of the above-mentioned blocked polyisocyanate solution. The mixture was painted with roll coater on 0.3-mm thick, surface-treated galvanized sheet iron to a dried coating film thickness of 20μ to bake in the atmosphere at 280° C. for 60 seconds, thereby yielding a glossy white coating film. The properties of the coating film are shown in Table 1.

EXAMPLE 3

According to a conventional method, 700 parts of methyl methacrylate, 207 parts of n-butyl acrylate and 93 parts of 2-hydroxyethyl methacrylate were copolymerized in 250 parts of xylene and 250 parts of butyl acetate, and there was obtained an acrylic polyol resin with molecular weight of about 15,000, solid content of 50% and hydroxyl value of 20. On the other hand, 116.5 parts of 1,3-bis(isocyanatomethyl)cyclohexane was dissolved in 156.1 parts of ethoxyethyl acetate, and 87.1 parts of methyl ethyl ketoxime was added dropwise to the solution over a 1-hour period, followed by heating at 75° to 80° C. for 1 hour after the completion of the addition. Then, 0.38 part of dibutyltin dilaurate and 122 parts of an oil-modified polyester polyol (a resin obtained by condensing in a conventional procedure 444 parts of phthalic anhydride, 200 parts of coconut oil fatty acid, 152 parts of propylene glycol and 268 parts of trimethylolpropane was dissolved in butyl acetate to a 70% solution. Acid value of 4.0 and hydroxyl value of 115) were added to allow them to undergo reaction at 75° to 80° C. for 4 hours. In this manner, there was obtained a blocked polyisocyanate solution in which the content of regenerated isocyanate was 8.3% and the content of solid portion was 60%. 2800 parts of the above-mentioned acrylic polyol resin and 1137 parts of titanium oxide were kneaded, and mixed with 1.5 parts of 1,1,3,3-tetrabutyl-1,3-diacetoxydistannoxane and 508 parts of the above-mentioned blocked polyisocyanate solution. The mixture was painted with roll coater on 0.3-mm thick, surface-treated galvanized sheet iron to a dried coating film thickness of 20μ to bake in the atmosphere of 280° C. for 60 seconds, thereby yielding a glossy white coating film. The properties at the coating film are shown in Table 1.

REFERENCE EXAMPLE 3

In 183.3 parts of ethoxyethyl acetate was dissolved 157.4 parts of 4,4'-methylenebis(cyclohexylisocyanate), and 87.1 parts of methyl ethyl ketoxime was added dropwise to the solution over a 1-hour period, followed by heating further at 75° to 80° C. for 1 hour after the completion of the addition. Then, 0.44 part of dibutyltin dilaurate and 122 parts of the oil-modified polyester resin solution (the same as utilized in Example 3) were added to be allowed to undergo reaction at 75° to 80° C. for 6 hours. In this way, there was obtained a blocked polyisocyanate solution in which the content of regenerated isocyanate was 7.3% and the content of solid portion was 60%. 2800 parts of the acrylic polyol resin (the same as utilized in Example 3) and 1165 parts of titanium oxide were kneaded, and mixed with 1.7 parts of 1,1,3,3-tetra-n-butyl-1,3-diacetoxydistannoxane and 579 parts of the above-mentioned blocked polyisocyanate solution. The mixture was painted with roll coater on 0.3-mm thick, surface-treated galvanized sheet iron to a dried coating film thickness of 20μ to bake in the atmosphere at 280° C. for 60 seconds, thereby yielding a glossy white coating film. The properties of the coating film are shown in Table 1.

EXAMPLE 4

In 474.9 parts of ethoxyethyl acetate was dissolved 361.2 parts of 1,3-bis(isocyanatomethyl)cyclohexane, and 1.26 parts of dibutyltin diluarate was added to the solution, followed by gradually adding molten ε-caprolactam dropwise to the reaction mixture in such a way that its temperature may be maintained at 70° to 75° C. After the completion of the addition, the mixture was further heated at 75° to 80° C. for 2 hours. Then, 239 parts of a polyester resin (obtained by condensing by a conventional procedure 876.6 parts of adipic acid, 186.3 parts of ethylene glycol, 201.2 parts of trimethylolpropane and 402.3 parts of dipropylene glycol. Acid value of 3.5, hydroxyl value of 172 and solid content of 100%) was added to heat at 75° to 80° C. for 5 hours. In this manner, there was obtained a blocked polyisocyanate solution in which the content of regenerated isocyanate was 7.8% and the content of solid portion was 60%. 2550 parts of the polyester polyol resin (the same as utilized in Example 1) and 895 parts of titanium oxide were kneaded, and mixed with 1.6 parts of 1,1,3,3-tetra-n-butyl-1,3-diacetoxydistannoxane and 538 parts of the above-mentioned blocked polyisocyanate solution. The mixture was painted with roll coater on 0.3-mm thick, surface-treated galvanized sheet iron to a dried coating film thickness of 20μ to bake in the atmosphere of 280° C. for 60 seconds, thereby yielding a glossy white coating film. The properties at the coating film are shown in Table 1.

TABLE 1

|  | Example 1 | Example 2 | Example 3 | Example 4 | Reference Example 1 | Reference Example 2 | Reference Example 3 |
|---|---|---|---|---|---|---|---|
| Gloss (60° mirror reflection) | 98 | 99 | 98 | 98 | 97 | 96 | 97 |
| Pencil hardness | 3H | 3H | 3H | 3H | H | 4H | 4H |
| Processability (OT bending test) | Passed | Passed | Passed | Passed | Passed | Not passed | Not passed |
| Staining property: |  |  |  |  |  |  |  |
| Felt pen; red | Passed | Passed | Passed | Passed | Not passed | Passed | Passed |
| blue | Passed | Passed | Passed | Passed | Not passed | Passed | Passed |
| black | Passed | Passed | Passed | Passed | Not passed | Passed | Passed |
| Mustard | Passed | Passed | Passed | Passed | Not passed | Passed | Passed |
| Chemical resistance: |  |  |  |  |  |  |  |
| 5% HCl, 30 days | Passed | Passed | Passed | Passed | Blister | Passed | Passed |
| 5% NaOH, 30 days | Passed | Passed | Passed | Passed | Blister | Passed | Passed |

EXAMPLE 5

194.2 parts of 1,3-bis(isocyanatomethyl)cyclohexane was mixed with 312.4 parts of methyl ethyl ketone, followed by heating at 70° to 75° C. 75.1 parts of triethylene glycol was added over a period of 1 hour to maintain the temperature and allowed to undergo reaction at a temperature within the range of 70° to 75° C. for 3 hours. Then, the reaction mixture was cooled to 35° to 40° C. and to the reaction mixture was added 43.1 parts of ethyleneimine over a period of 1 hour, followed by heating further at 35° to 40° C. for 1 hour after the completion of the addition. In this manner, there was obtained a solution of blocked isocyanate compound in which the content of aziridine group was 8.1% and the content of solid portion was 60%.

2550 parts of the polyester polyol resin (the same as prepared in Example 1) and 888 parts of titanium oxide were kneaded, and further mixed with 521 parts of the above-mentioned solution of the blocked isocyanate compound. The mixture was applied with roll coater on 0.3-mm thick, surface-treated galvanized sheet iron to a dried coating film thickness of 20μ, which was then baked in the atmosphere at 190° C. for 30 seconds, thereby yielding a glossy white coating film. The properties of the coating film are shown in Table 2.

EXAMPLE 6

According to a conventional method, 690 parts of methyl methacrylate, 207 parts of n-butyl acrylate, 93 parts of 2-hydroxyethyl methacrylate and 10 parts of acrylic acid were copolymerized in 500 parts of xylene and 500 parts of butyl acetate, and there was obtained an acrylic polyol resin with molecular weight of about 15,000, solid content of 50% and hydroxyl value of 20.

On the other hand, 168.2 parts of hexamethylenediisocyanate was dissolved into 190.9 parts of methyl ethyl ketone, followed by heating at 70° to 75° C. 75.1 parts of triethylene glycol was added slowly to maintain the temperature. After the addition of triethylene glycol, the reaction mixture was heated further at 70° to 75° C. for 3 hours. Then, the reaction mixture was cooled to 35° to 40° C. and to the reaction mixture was added 43.1 parts of ethyleneimine over a period of 1 hour to maintain the temperature, followed by heating further 35° to 40° C. for 1 hour after the completion of the addition. In this manner, there was obtained a solution of blocked isocyanate compound in which the content of aziridine group was 8.8% and the content of solid portion was 60%.

2800 parts of the above-mentioned acrylic polyol resin and 1124 parts of titanium oxide were kneaded, and further mixed with 477 parts of the above-mentioned solution of the blocked isocyanate compound. The mixture was applied with roll coater on 0.3-mm thick, surface-treated galvanized sheet iron to a dried coating film thickness of 20μ, which was then baked in the atmosphere at 190° C. for 30 seconds, thereby yielding a glossy white coating film. The properties of the coating film is shown in Table 2.

REFERENCE EXAMPLE 4

168.2 parts of hexamethylene diisocyanate was dissolved into 220.3 parts of methyl ethyl ketone, followed by heating at 70° to 75° C. 75.1 parts of triethylene glycol was added slowly to maintain the temperature.

After the addition of triethylene glycol, the reaction mixture was heated further at 70° to 75° C. for 3 hours. Then, to the reaction mixture was added 87.1 parts of methyl ethyl ketoxime over a period of 1 hour, followed by heating further at 70° to 75° C. for 1 hour after the completion of the addition.

In this manner, there was obtained a solution of blocked isocyanate compound in which the content of regenerated isocyanate was 7.6% and the content of solid portion was 60%.

2800 parts of the acrylic polyol resin (the same as used in Example 6) and 1153 parts of titanium oxide were kneaded and further mixed with 551 parts of the above-mentioned solution of the blocked isocyanate compound. The mixture was applied with roll coater on 0.3-mm thick, surface-treated galvanized sheet iron to a dried coating film thickness of 20μ, which was then baked in the atmosphere at 280° C. for 60 seconds, thereby yielding a glossy white coating film. The properties of the coating film are shown in Table 2.

EXAMPLE 7

174.2 parts of tolylene diisocyanate (2,4-tolylene diisocyanate/2,6-tolylene diisocyanate=80/20) was dissolved into 212.9 parts of methyl ethyl ketone, followed by heating at 70° to 75° C. 102.1 parts of 2,2-dimethyl-3-hydroxypropyl-2,2-dimethyl-3-hydroxypropionate was added over a period of 1 hour. After the addition of the above compound, the reaction mixture was heated further at 70° to 75° C. for 2 hours. Then, the reaction mixture was cooled to 35° to 40° C. and to the reaction mixture was added 43.1 parts of ethyleneimine over a period of 1 hour to maintain the temperature, followed by heating further at 35° to 40° C. for 1 hour after the completion of the addition. In this manner, there was obtained a solution of blocked isocyanate compound in which the content of aziridine group was 7.9% and the content of solid portion was 60%.

2550 parts of the polyester polyol resin (the same as used in Example 1) and 893 parts of titanium oxide were kneaded, and further mixed with 532 parts of the above-mentioned solution of the blocked isocyanate compound. The mixture was applied with roll coater on 0.3-mm thick, surface-treated galvanized sheet iron to a dried coating film thickness of 20μ, which was then baked in the atmosphere at 190° C. for 30 seconds, thereby yielding a glossy white coating film. The properties of the coating film are shown in Table 2.

EXAMPLE 8

194.2 parts of 1,3-bis(isocyanatomethyl)cyclohexane was dissolved into 375.7 parts of methyl ethyl ketone, followed by heating at 70° to 75° C. 326.2 parts of a polyester polyol resin (one obtained by a conventional condensation method of 584.6 parts of adipic acid, 124.1 parts of ethylene glycol, 268.2 parts of dipropylene glycol and 134.1 parts of trimethylol propane; acid value of 2.3, hydroxyl value of 172 and solid content of 100%) was added over a period of 1 hour. After the addition of the above resin, the reaction mixture was heated further at 70° to 75° C. for 3 hours.

Then, the reaction mixture was cooled to 35° to 40° C. and to the reaction mixture was added 43.1 parts of ethyleneimine over a period of 1 hour, followed by heating further at 35° to 40° C. for 1 hour after the completion of the addition. In this manner, there was obtained a solution of blocked isocyanate compound in which the content of aziridine group was 4.5% and the content of solid portion was 60%.

2800 parts of the acrylic polyol resin (the same as used in Example 6) and 1309 parts of titanium oxide were kneaded, and further mixed with 939 parts of the above-mentioned solution of the blocked isocyanate compound. The mixture was applied with roll coater on 0.3-mm thick, surface-treated galvanized sheet iron to a dried coating film thickness of 20μ, which was then baked in the atmosphere of 190° C. for 30 seconds, thereby yielding a glossy white coating film. The properties of the coating film are shown in Table 2.

TABLE 2

| | Example 5 | Example 6 | Example 7 | Example 8 | Reference Example 4 |
|---|---|---|---|---|---|
| Gloss (60° mirror reflection) | 99 | 98 | 99 | 99 | 97 |
| Pencil hardness | 4H | 3H | 4H | 4H | H |
| Processability (OT bending test) | Passed | Passed | Passed | Passed | Passed |
| Staining property: | | | | | |

TABLE 2-continued

|  | Example 5 | Example 6 | Example 7 | Example 8 | Reference Example 4 |
|---|---|---|---|---|---|
| Felt pen; red | Passed | Passed | Passed | Passed | Not passed |
| blue | Passed | Passed | Passed | Passed | Not passed |
| black | Passed | Passed | Passed | Passed | Not passed |
| Mustard | Passed | Passed | Passed | Passed | Not passed |
| Chemical resistance: |  |  |  |  |  |
| 5% HCl, 30 days | Passed | Passed | Passed | Passed | Blister |
| 5% NaOH, 30 days | Passed | Passed | Passed | Passed | Blister |

EXAMPLE 9

111.1 parts of 3-isocyanatomethyl-3,5,5-trimethylcyclohexylisocyanate was dissolved into 102.8 parts of methyl ethyl ketone, followed by heating at 35° C. 43.1 parts of ethyleneimine was added slowly to maintain the temperature. After the completion of the addition, the reaction mixture was heated further at 35° to 40° C. for 1 hour. In this manner, there was obtained a solution of blocked isocyanate compound in which the content of aziridine group was 16.3% and the content of solid portion was 60%. 2550 parts of the polyester polyol resin (the same as used in Example 1) and 783 parts of titanium oxide were kneaded, and further mixed with 257 parts of the above-mentioned solution of the blocked isocyanate compound. The mixture was applied with roll coater on 0.3-mm thick, surface-treated galvanized sheet iron to a dried coating film thickness of 20μ, which was then baked in the atmosphere of 190° C. for 30 seconds, thereby yielding a glossy white coating film. The properties of the coating film are shown as follows.

| Gloss (60° mirror reflection) | 99 |
|---|---|
| Pencil hardness | 4H |
| Processability (OT bending test) | Passed |
| Staining property: |  |
| Felt pen; red | Passed |
| blue | Passed |
| black | Passed |
| Mustard | Passed |
| Chemical resistance: |  |
| 5% HCl, 30 days | Passed |
| 5% NaOH, 30 days | Passed |

EXAMPLE 10

194.2 parts of 1,3-bis(isocyanatomethyl)cyclohexane was dissolved into 312.4 parts of methyl ethyl ketone, followed by heating at 70° to 75° C. To the solution was added 75.1 parts of triethylene glycol over a period of 1 hour to maintain the temperature. After the completion of the addition of triethylene glycol, the reaction mixture was heated further at 70° to 75° C. for 3 hours. The reaction mixture was cooled to 35° to 40° C. and to the reaction mixture was added 43.1 parts of ethyleneimine to maintain the temperature.

After the completion of the addition of ethyleneimine, the reaction mixture was heated further at 35° to 40° C. for 1 hour. In this manner, there was obtained a solution of blocked isocyanate compound in which the content of solid portion was 60% and the content of aziridine group was 8.1%.

715 parts of epoxy polyol resin (a 40% solution in methyl ethyl ketone of a linear polymer obtained by condensation of bisphenol A with epichlorhydrin; hydroxyl value of the solution=78.5) and 399 parts of titanium oxide were kneaded, and mixed with 521 parts of the above-mentioned solution of the blocked isocyanate compound. The mixture was painted with roll coater on 0.3-mm thick, surface-treated galvanized sheet iron to a dried coating film thickness of 20μ to bake in the atmosphere of 190° C. for 30 seconds, thereby yielding a glossy white coating film. The properties of the coating film are shown as follows.

| Gloss (60° mirror reflection) | 98 |
|---|---|
| Pencil hardness | 3H |
| Processability (OT bending test) | Passed |
| Staining property: |  |
| Felt pen; red | Passed |
| blue | Passed |
| black | Passed |
| Mustard | Passed |
| Chemical resistance: |  |
| 5% HCl, 30 days | Passed |
| 5% NaOH, 30 days | Passed |

What is claimed is:

1. A method for shaping a pre-coat metal which comprises:
   (a) coating a metal plate with a composition comprising (i) bis-(isocyanatomethyl)cyclohexane or its adduct wherein one or more of the isocyanate groups are blocked with a blocking agent selected from the group consisting of phenols, oximes, lactams and imines, and (ii) at least one member selected from the group consisting of a polyester polyol, an acrylic polyol produced by copolymerizing (1) one or more hydroxyl containing monomers with (2) one or more copolymerizable α,β-ethylenically unsaturated monomers and an epoxy polyol resin, the ratio of (i) to (ii) being about 0.5 to 2.0,
   (b) heating the so coated plate for curing, and then
   (c) subjecting said coated metal plate to OT bending.

* * * * *